(12) United States Patent
Swinford et al.

(10) Patent No.: US 8,683,905 B2
(45) Date of Patent: Apr. 1, 2014

(54) METHODS OF SKIVING METAL AND FORMING A FIN IN A HEAT EXCHANGER

(75) Inventors: Mark Douglas Swinford, Centerville, OH (US); Michael Ralph Storage, Beavercreek, OH (US)

(73) Assignee: Unison Industries, LLC, Jacksonville, FL (US)

( * ) Notice: Subject to any disclaimer, the term of this patent is extended or adjusted under 35 U.S.C. 154(b) by 229 days.

(21) Appl. No.: 13/338,523

(22) Filed: Dec. 28, 2011

(65) Prior Publication Data
US 2013/0167704 A1 Jul. 4, 2013

(51) Int. Cl.
*B26D 11/00* (2006.01)

(52) U.S. Cl.
USPC .................................. 83/862; 83/13

(58) Field of Classification Search
USPC .................. 72/324; 83/861, 862, 13
See application file for complete search history.

(56) References Cited

U.S. PATENT DOCUMENTS

| | | | |
|---|---|---|---|
| 3,222,764 A | 12/1965 | Hansson et al. | |
| 3,247,583 A | 4/1966 | Hansson et al. | |
| 7,048,097 B2 * | 5/2006 | Arbesman ................. | 188/250 B |
| 7,121,494 B2 * | 10/2006 | Shiga et al. ................ | 242/348.2 |
| 7,125,176 B1 * | 10/2006 | Stafford et al. ................. | 385/94 |
| 7,222,701 B2 * | 5/2007 | Pham ........................ | 188/250 G |
| 7,428,883 B2 * | 9/2008 | Hamada et al. .............. | 122/31.1 |
| 7,566,228 B2 * | 7/2009 | Chiu ................................ | 439/66 |
| 7,637,751 B1 * | 12/2009 | Chiu ................................ | 439/66 |
| 2004/0140165 A1 | 7/2004 | Pham | |
| 2006/0276110 A1 * | 12/2006 | Friel et al. ........................ | 451/45 |
| 2007/0157443 A1 * | 7/2007 | Baldwin et al. ................. | 29/237 |
| 2009/0004890 A1 * | 1/2009 | Chiu ................................ | 439/66 |
| 2012/0060610 A1 * | 3/2012 | Oaks et al. ..................... | 73/632 |
| 2012/0279686 A1 * | 11/2012 | Chainer et al. ........... | 165/104.21 |
| 2013/0001289 A1 * | 1/2013 | Tedford ....................... | 229/403 |
| 2013/0240195 A1 * | 9/2013 | Chen ............................ | 165/185 |

FOREIGN PATENT DOCUMENTS

| | | |
|---|---|---|
| JP | S5468554 A | 6/1979 |
| JP | S60226696 A | 11/1985 |

OTHER PUBLICATIONS

David L. Ellis, GRCop-84: A High-Temperature Copper Alloy for High-Heat-Flux Applications, Feb. 2005.
Search Report and Written Opinion from EP Application No. 12196903.4 dated Aug. 5, 2013.

* cited by examiner

*Primary Examiner* — Sean Michalski
(74) *Attorney, Agent, or Firm* — McGarry Bair

(57) ABSTRACT

Methods of skiving metal using a skiving blade to form a shaving and methods of forming fins in a heat exchanger by skiving using a skiving blade. Where the metal body used to form the shaving or fin is made from a metal material having a hardness greater than that of aluminum.

24 Claims, 7 Drawing Sheets

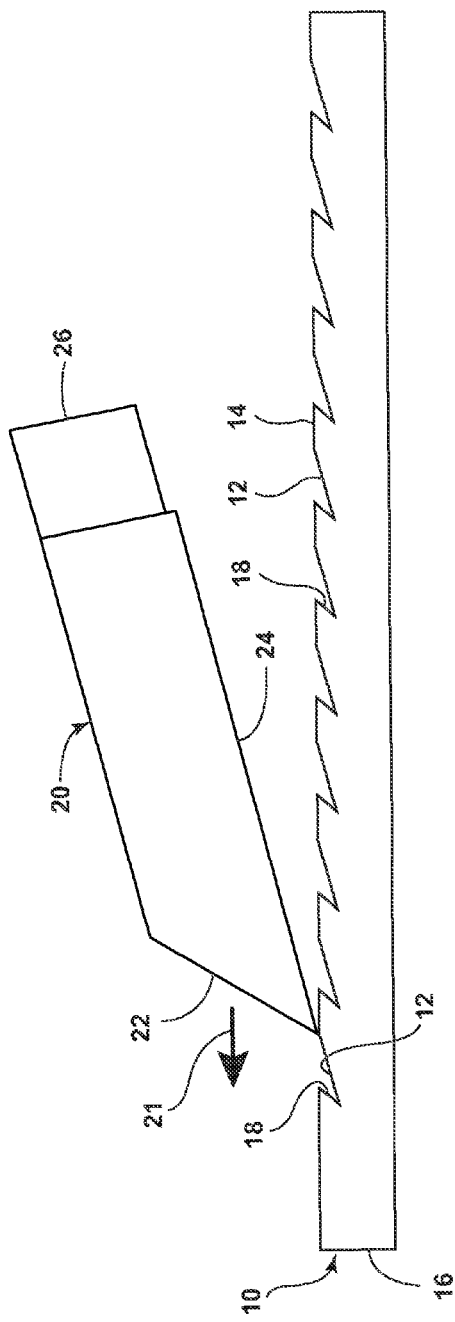
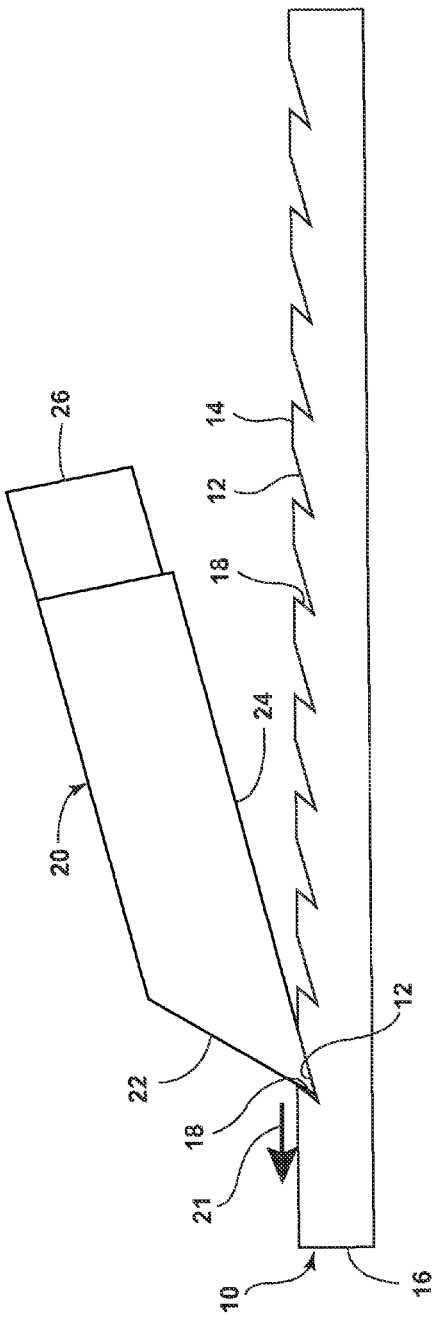

METHODS OF SKIVING METAL AND FORMING A FIN IN A HEAT EXCHANGER

BACKGROUND OF THE INVENTION

Skiving may be generally used to produce a series of very fine integrated shavings on a metal body and the shavings may all have generally the same shape and size. For example, a heat exchanger manufacturer may use the skiving technique to create metal fins where the fin of the heat exchanger then provides a way to transfer heat from one medium to another. Integral fins formed from the parent material have a significantly higher heat transfer coefficient versus fins which may be brazed or otherwise attached to the metal body. The fins of such heat exchangers provide large surface areas required for transferring heat to the surrounding air. Usually such fins are skived out of a single block of metal such as copper or aluminum, which are materials currently used on low temperature applications.

BRIEF DESCRIPTION OF THE INVENTION

In one embodiment, a method of skiving metal using a skiving blade includes forming a nick in a surface of a metal material having a hardness greater than aluminum, introducing the skiving blade into the nick, and advancing the skiving blade from the nick into the metal material thereby forming a shaving.

In another embodiment a method of forming fins in a heat exchanger having a metal body made from a material having a hardness greater than aluminum, with the metal body having an upper surface and at least one fluid passage in the metal body includes forming a nick in the surface, introducing a skiving blade into the nick, and advancing the skiving blade from the nick into the material forming a fin that remains attached to the metal body.

BRIEF DESCRIPTION OF THE DRAWINGS

In the drawings:

FIG. 3 is a schematic side view illustrating the metal body of FIG. 2A with a skiving blade which may be used according to an embodiment of the invention;

FIG. 4 is a schematic side view illustrating the metal body and skiving blade of FIG. 3 with the skiving blade being introduced into a nick according to an embodiment of the invention;

DESCRIPTION OF EMBODIMENTS OF THE INVENTION

While aluminum and copper are materials that are often used in skiving, especially for heat exchangers, it is considered that such materials may not be suitable for various applications and environments wherein higher-temperature materials must be used. For example, in an environment such as a jet engine, where temperatures exceed the melting point of aluminum and copper, a nearly pure nickel material, such as nickel 201, or some alloys of nickel may be desired as it has a high heat transfer coefficient and is suitable for such an environment. However, because nickel and its relevant high-temperature alloys are relatively hard materials, much harder than aluminum and copper, it is also difficult to skive and currently known skiving techniques do not result in uniform shavings that are repeatable.

Figure 1:
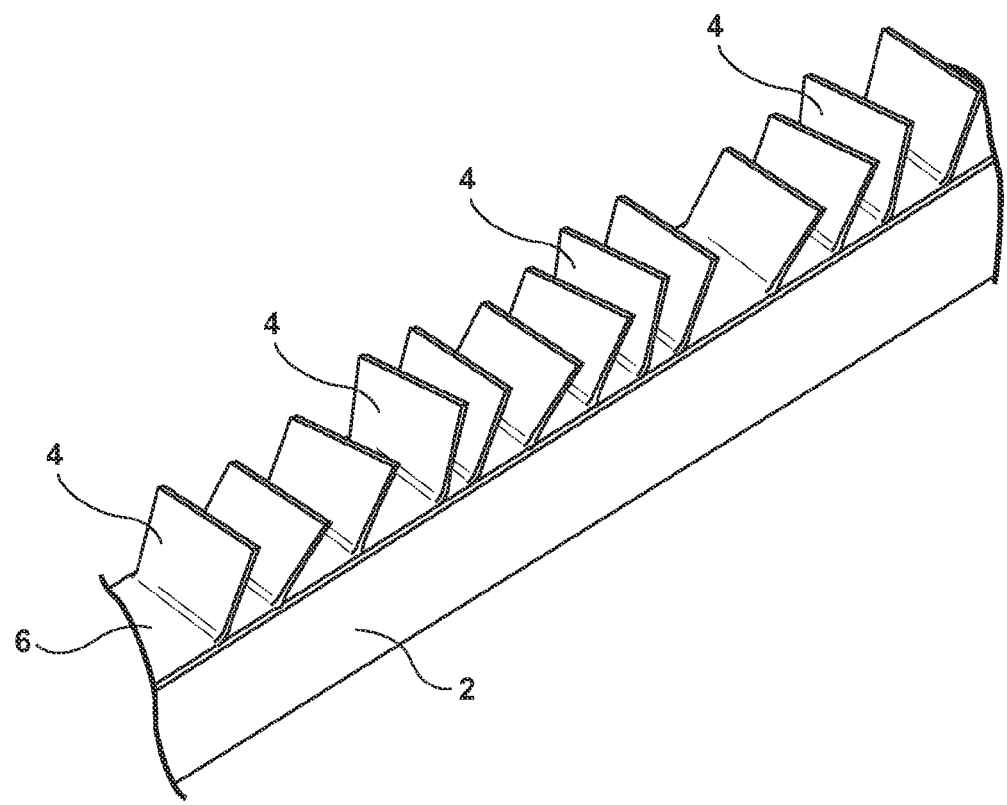
FIG. 1 is a schematic perspective view illustrating uneven shavings and uneven spacing between shavings which embodiments of the invention overcome.

FIG. 1 illustrates that in nickel or a similarly hard metal material 2 that is worked according to current skiving practices, the shavings 4 that are formed are very irregular both in size and in spacing. Further, a cutting tool (not shown) used for forming the shavings 4 will not have a long life because the cutting tool will skate along the surface 6 of the hard metal material 2 until enough pressure is built up at the nose of the cutting tool to enter into the hard metal material 2. This excess pressure causes the cutting tool nose to wear more quickly, and puts a larger bending load on the cutting tool nose, which in turn can lead to early fatigue of the cutting tool.

Figure 2A:
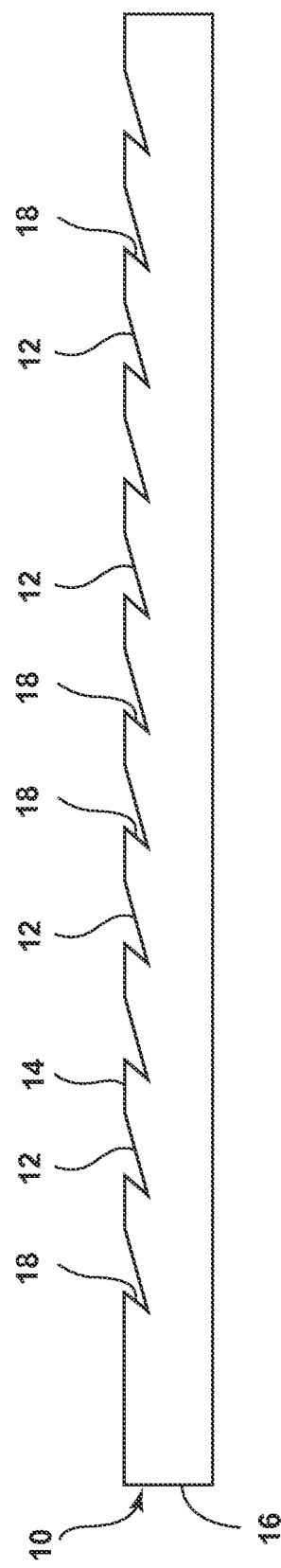
FIG. 2A is a schematic side view illustrating a metal body with nicks formed in a surface of the metal body according to an embodiment of the invention.

The embodiments of the methods of the invention allow for the skiving of uniform shavings on a metal material having a hardness greater than aluminum. By way of non-limiting examples, such a metal may include nickel or a nickel alloy. It will be understood that such materials are exemplary and that other materials having a hardness greater than aluminum may also be used according to the embodiments of the invention. For example, a method of skiving metal having a hardness greater than aluminum, including a metal body 10, according to one embodiment of the invention may include forming a nick 12 in a surface 14 of the metal body 10 as shown in FIG. 2A. It is contemplated that the nick 12 in the surface 14 may be formed in any suitable manner. By way of non-limiting examples, forming the nick 12 may include etching the surface 14, cutting the surface 14 with an EDM wire (not shown), or cutting the surface 14 with a dovetail type milling cutter (not shown).

Figure 2B:
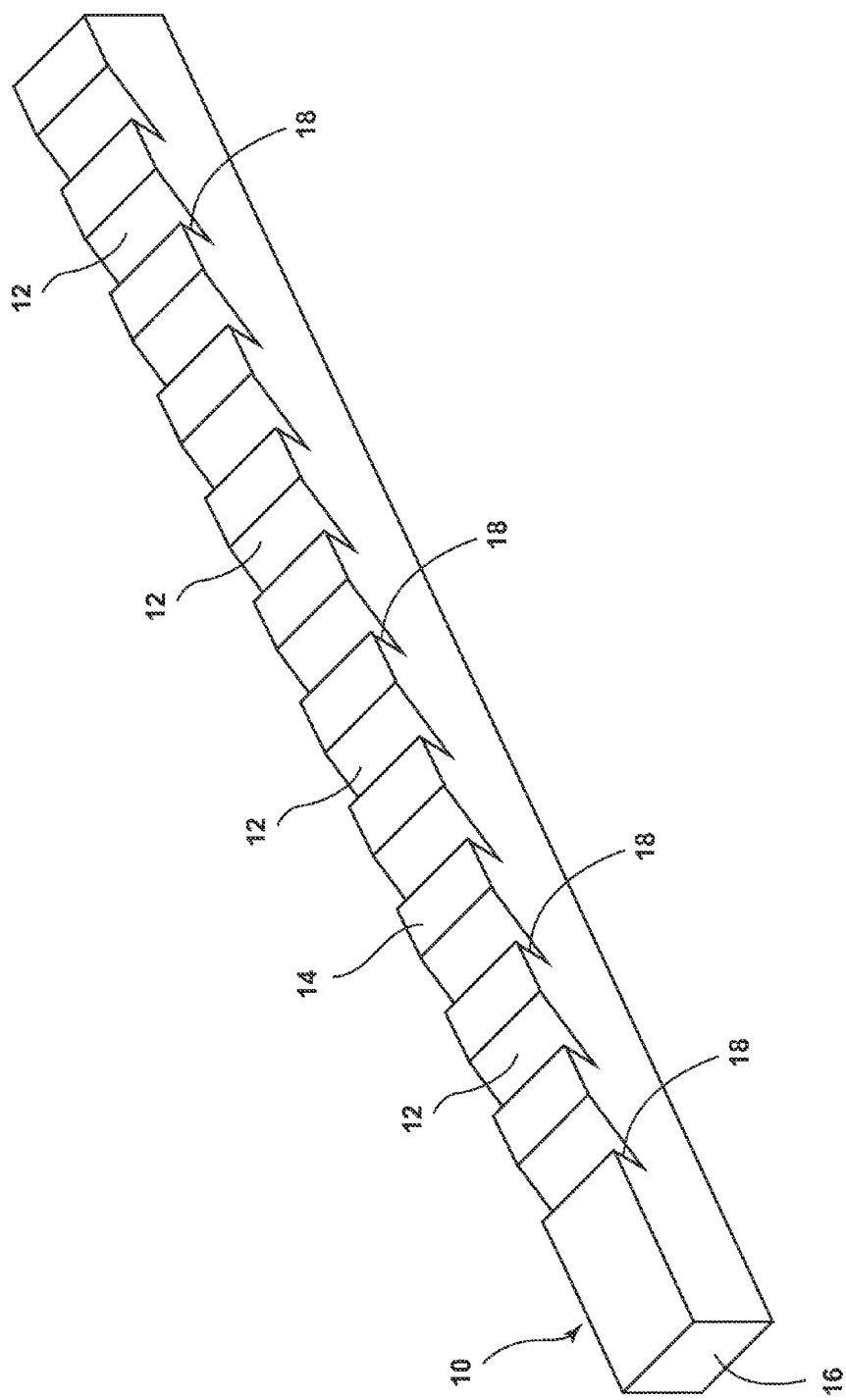
FIG. 2B is a schematic perspective view illustrating the metal body of FIG. 2A.

FIG. 2B shows the metal body 10 in perspective; it may be understood that the nick 12 may be made along a width of the metal body 10. Forming the nick 12 may include forming a plurality of nicks 12. Such a plurality of nicks 12 may be in a row. Forming the plurality of nicks 12 in a row may include forming multiple rows of nicks 12 on the width of metal body 10 or may include forming multiples rows of nicks 12 along the length of the metal body. In the instant illustration a rows of nicks 12 is illustrated as being along a portion of the length of the metal body 10. It is contemplated that the nicks 12 may not start immediately at a first end 16 of the metal body so that there is material to be skived between the first nick 12 and the first end 16. The distance or pitch between nicks may be set to equal the desired fin spacing.

It is also contemplated that the nicks 12 may take a variety of shapes and cross-sections depending upon the material forming the metal body 10 and depending upon the intended use of the metal body 10 once it has been skived. By way of non-limiting examples, the nick 12 may be a small indentation formed in the surface 14, a groove formed in the surface 14, or a deeper recess formed in the surface 14. It has been contemplated that the nicks 12 may be on the order of 0.010 inches to 0.015 inches deep. As a further example, forming a nick 12 that is a recess may include forming an acute ledge 18 in the metal body 10 that is oriented in a certain direction with respect to the surface 14. As shown in FIG. 3, a skiving blade 20 may be used in forming a shaving 30 (FIG. 5) on the metal body 10. The acute ledge 18 may be directed toward a direction of advancement, illustrated as arrow 21, of the skiving blade 20.

After the desired nicks 12 are formed, the skiving blade 20 may be introduced into one of the nicks 12, preferably a nick towards the first end 16, as shown in FIG. 4. The skiving blade 20 may have a leading edge 22 and a bottom edge 24. It is contemplated that the skiving blade 20 may be introduced into the nick 12 at an angle such that the bottom edge 24 of the skiving blade 20 is at an angle with respect to the surface 14 of the metal body 10.

Figure 5:
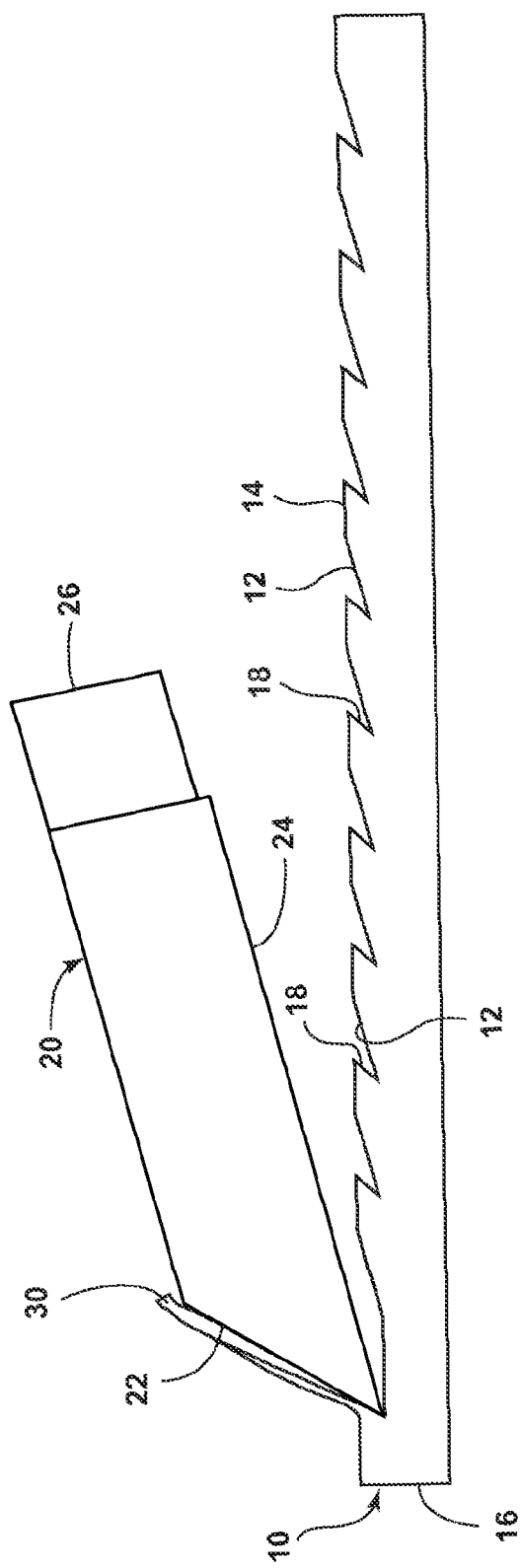
FIG. 5 is a schematic side view illustrating an advancement of the skiving blade from the nick to form a shaving in the metal body of FIG. 3 according to an embodiment of the invention.

The skiving blade 20 may be operably coupled to a cutter backing block 26 or other machine which may apply a driving pressure to the skiving blade 20. It is contemplated that a driving pressure may be applied in any suitable manner that may exert a force on the skiving blade 20 as it is driven into the nick 12. The skiving blade 20 may be pushed by the cutter backing block 26 such that the skiving blade 20 may be advanced from the nick 12 into the metal body 10 thereby producing a shaving 30, which is formed at the leading edge 22 of the skiving blade 20. The advancement of the skiving blade 20 may be stopped while the shaving 30 is attached to the metal body 10 such that the shaving 30 remains attached to the metal body 10 as shown in FIG. 5. This may be done for each of the nicks 12 until a plurality of shavings 30 are formed on the metal body 10.

It has been determined that the nicks 12 aid in forming shavings in the form of fins according to yet another embodiment of the invention. By way of non-limiting example, it is contemplated that a finned heat exchanger may be formed according to an embodiment of the invention. Such a finned heat exchanger may be used in any applicable environment including by way of non-limiting example on a jet engine, which produces substantial amounts of heat that must be transferred away from the engine.

Figure 6:
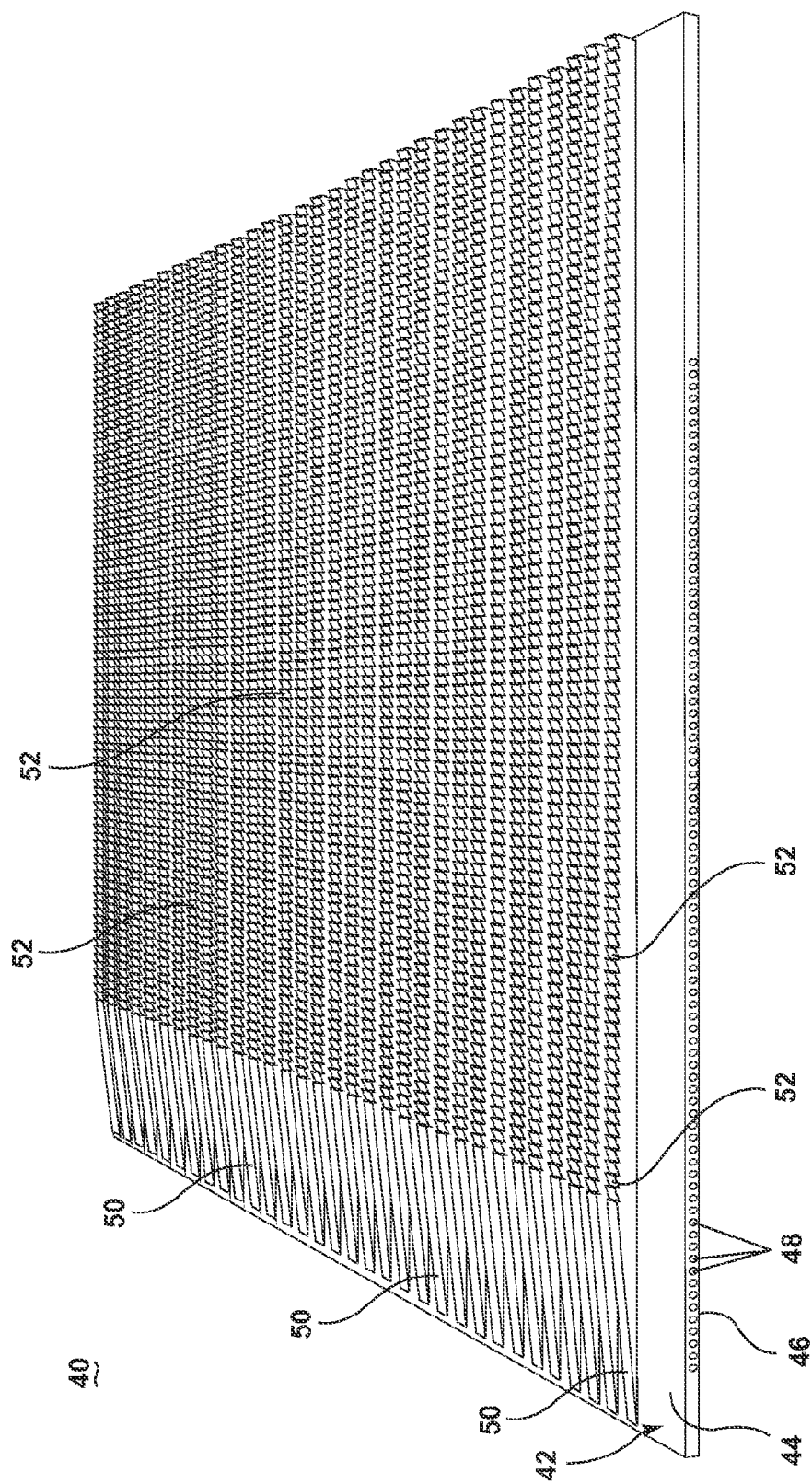
FIG. 6 is a perspective view of a metal body of a heat exchanger with rows of nicks formed according to yet another embodiment of the invention.

As illustrated in FIG. 6, a portion of a heat exchanger 40 may include a heat exchanger body 42 that may be formed from a material having a hardness greater than aluminum. The heat exchanger body 42 may include a first surface shown as an upper surface 44 and a second surface shown as a lower surface 46, which opposes the upper surface 44 as well as at least one fluid passage 48. Multiple fluid passages 48 have been illustrated as being included in the heat exchanger body 42 and it is contemplated that such fluid passages 48 may take any number of sizes and shapes to aid in transferring heat from fluid being carried within the fluid passages 48.

It is contemplated that multiple projections 50 may be included in the heat exchanger body 42 and may from a portion of the upper surface 44. Any number of multiple projections 50 may be included in the heat exchanger body 42 and the multiple projections 50 may take a variety of shapes and sizes including that the widths of the multiple projections 50 and their spacing may be varied. Such multiple projections 50 may be formed in any suitable manner including by way of non-limiting example that the multiple projections 50 may be ridges machined from metal base stock forming the heat exchanger body 42. More specifically, by forming multiple spaced grooves in the base stock the multiple projections 50 may be machined into the heat exchanger body 42. By way of further non-limiting example, the multiple projections 50 may be cut via an EDM wire from the heat exchanger body 42.

As with the above described embodiments, nicks 52 may be formed in the upper surface 44 of the heat exchanger body 42. More specifically, a plurality of nicks 52 are illustrated as being formed in the multiple projections 50. The plurality of nicks 52 are illustrated as including multiple rows of nicks 12 on the multiple projections 50 and rows of nicks 12 along the length of each the multiple projections 50. In the instant illustration rows of nicks 12 are illustrated as being along all of the multiple projections 50 for a majority of the length of multiple projections 50. The nicks 52 have been illustrated as a recess having an acute ledge as with the embodiments described above; however, it will be understood that the nicks 52 may be formed in any number of suitable shapes and dimensions.

Figure 7:
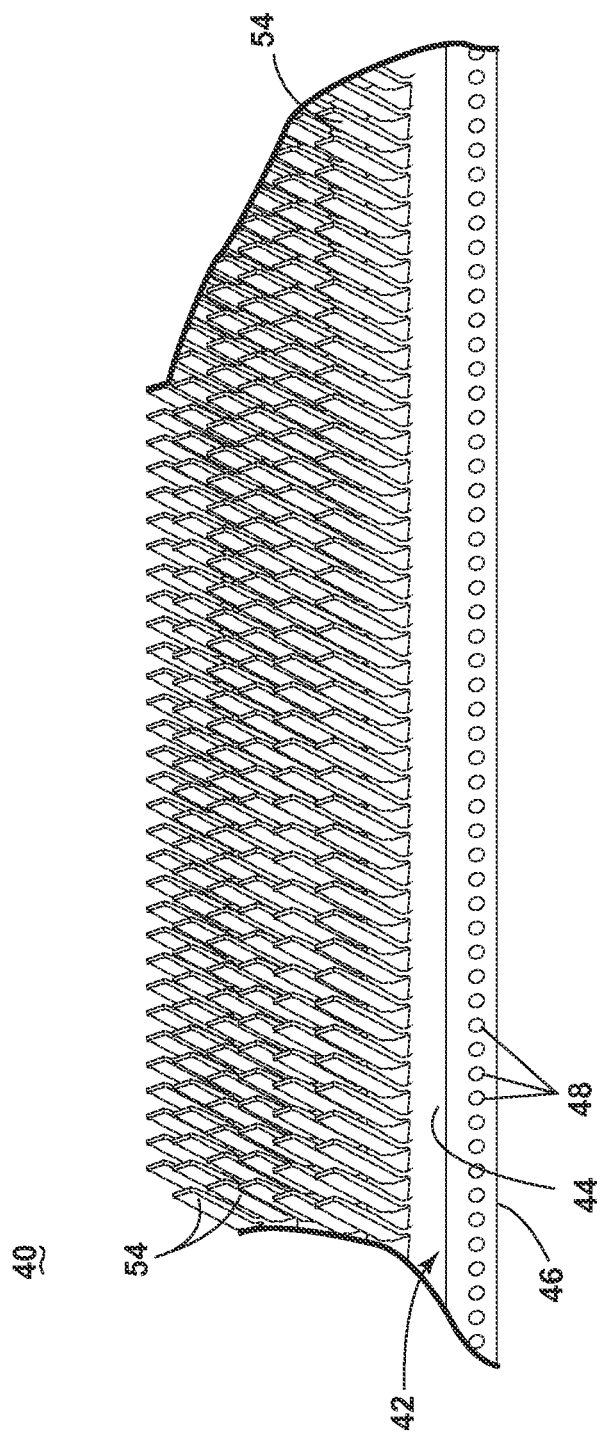
FIG. 7 is a perspective view of the metal body of FIG. 6 wherein fins have been formed according to a further embodiment of the invention.

Fins 54 may be formed by introducing a skiving blade (not shown) into the nick 52 and advancing the skiving blade from the nick 52 into the material forming the heat exchanger body 42 such that the fins 54 remain attached to the heat exchanger body 42 as shown in FIG. 7. If the multiple projections 50 are included in the heat exchanger body 42, the multiple projections 50 may permit the formation of discrete fins 54 during skiving, which further promotes improved airflow mixing. After the fins 54 have been formed the heat exchanger body 42 may be trimmed in any suitable way such that at least a section of a heat exchanger 40 may be formed. The section of heat exchanger 40 may be shaped and combined in any suitable manner with additional sections of any suitable shape and size such that a heat exchanger or heat exchanger assembly of varying proportions may be made and may be used in a variety of different applications including by way of non-limiting example that such heat exchangers may be used with a variety of different engines. During operation, fluid may be passed through the fluid passages 48 and heat from the fluid may be dissipated through the fins 54 to air flowing by the fins 54. In this manner a heat exchanger 40 having skived fins 54 may be formed from a heat exchanger body 42 formed from a material having a hardness greater than that of aluminum.

The above described embodiments provide for a variety of benefits including that shavings and fins may be created in harder metal materials, which may be needed for various applications. The above described embodiments may be more affordable, repeatable, and more reliable methods of producing shavings and fins on a hard metal material as the nicks provide an entry point for the cutter into the significantly harder material, which allows for predictable fin geometry at predictable spacing. The nicks also reduce the load on the skiving blade, thereby increasing the life of the skiving blade. The fins may be created with the size and uniformity desired and may be grouped together in a pattern that increases the surface area and allows for enhanced airflow mixing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of skiving metal using a skiving blade, comprising:
   forming a nick in a surface of a metal material;
   introducing the skiving blade into the nick; and advancing the skiving blade from the nick into the metal material thereby forming a shaving.

2. The method of claim 1 wherein forming the nick comprises cutting the nick in the metal material.

3. The method of claim 2 wherein cutting the nick comprises cutting the metal material with an EDM wire.

4. The method of claim 1 wherein forming the nick comprises forming a plurality of nicks.

5. The method of claim 4 wherein forming the plurality of nicks comprises forming the nicks in a row.

6. The method of claim 5 wherein forming the nicks in the row comprises forming multiple rows of nicks.

7. The method of claim 6 wherein forming multiple rows of nicks comprises forming a row of nicks on multiple projections extending from the metal.

8. The method of claim 7, further comprising forming multiple, spaced grooves in the metal to form the multiple projections.

9. The method of claim 6 wherein advancing the skiving blade comprises stopping the advancing while the shaving is attached to the metal material.

10. The method of claim 9 wherein forming the shaving comprises forming a fin projecting from the metal material.

11. The method of claim 1 wherein advancing the skiving blade comprises stopping the advancing while the shaving is attached to the metal material.

12. The method of claim 11 wherein forming the shaving comprises forming a fin projecting from the metal material.

13. The method of claim 1 wherein forming the nick comprises forming a recess in the metal material.

14. The method of claim 13 wherein forming the recess comprises forming an acute ledge in the metal material directed toward a direction of advancement of the skiving blade.

15. The method of claim 1 wherein the metal material comprises at least one of a nickel or nickel alloy.

16. The method of claim 1 wherein the metal material has a hardness greater than aluminum.

17. A method of forming fins in a heat exchanger having a metal body made from a material, with the metal body having an upper surface and at least one fluid passage in the metal body, the method comprising:
 forming a nick in the surface;
 introducing a skiving blade into the nick; and
 advancing the skiving blade from the nick into the material forming a fin that remains attached to the metal body.

18. The method of claim 17 wherein forming the nick comprises cutting the material with an EDM wire.

19. The method of claim 17 wherein forming the nick comprises forming a recess in the material.

20. The method of claim 19 wherein forming the recess comprises forming an acute ledge in the material directed toward a direction of advancement of the skiving blade.

21. The method of claim 17 wherein forming the nick comprises forming a plurality of nicks in a row.

22. The method of claim 21 wherein forming the plurality of nicks in a row comprises forming multiple rows of nicks.

23. The method of claim 21 wherein forming multiple rows of nicks comprises forming a row of nicks on multiple projections extending from the metal.

24. The method of claim 17 wherein the material has a hardness greater than aluminum.

* * * * *